(12) United States Patent
Struve

(10) Patent No.: US 6,378,589 B1
(45) Date of Patent: Apr. 30, 2002

(54) CONTROLLED HEAT TRANSFER HEATING TOOL FOR WELDING THERMOPLASTIC SHEETS

(76) Inventor: Friedrich Struve, 3310 Maple Park Dr., Kingwood, TX (US) 77339

(*) Notice: Subject to any disclaimer, the term of this patent is extended or adjusted under 35 U.S.C. 154(b) by 0 days.

(21) Appl. No.: 09/569,266

(22) Filed: May 11, 2000

(51) Int. Cl.$^7$ ............................................. B32B 31/08
(52) U.S. Cl. .................... 156/499; 156/544; 156/583.4
(58) Field of Search ................................ 156/391, 499, 156/544, 553, 555, 580, 581, 582, 583.1, 583.4

(56) References Cited

U.S. PATENT DOCUMENTS

| | | | | |
|---|---|---|---|---|
| 4,146,419 A | * | 3/1979 | Neidhart | 156/391 |
| 4,655,872 A | * | 4/1987 | Neumuller et al. | 156/499 |
| 4,769,102 A | * | 9/1988 | Neumuller et al. | 156/359 |
| 5,051,148 A | * | 9/1991 | Resch | 156/358 |
| 5,490,626 A | * | 2/1996 | Kaminski | 228/44.3 |
| 5,897,721 A | * | 4/1999 | Kriofske et al. | 156/70 |
| 6,050,317 A | * | 4/2000 | Weissfloch | 156/499 |
| 6,153,033 A | * | 11/2000 | Kriefske et al. | 156/70 |
| 6,186,210 B1 | * | 2/2001 | Gehde | 156/499 |

OTHER PUBLICATIONS

Kolbasuk, Gary M., (1990) "Hot Wedge Fusion Welding of HDPE Geomembranes", The Seaming of Geosynthetics Elsevier Applied Science 1990 ISBN 1–85166–483–1 pp. 25 through 37.

Struve, F. (1993) "Consistent Wedge Welders" Geosynthetic Liner Systems: Innovations, Concern & Design Industrial Fabrics Assn Intnl ISBN 0–935803–01–7 pp. 9 through 23.

Lüders G, (1998) "Assessment of Seam Quality and Optimization of the Welding Process of HDPE Geomembranes" Sixth International Conference on Geotextiles 1998 pp. 337 through 344.

* cited by examiner

Primary Examiner—James Sells

(57) ABSTRACT

The invention provides for improved welding of thermoplastic sheets by selectively controlling the amount of heat transferred from an improved heated tool to various areas of the weld, by modifying the heat transfer efficiency of selected areas of the tool's heating surfaces.

4 Claims, 4 Drawing Sheets

CONTROLLED HEAT TRANSFER HEATING TOOL FOR WELDING THERMOPLASTIC SHEETS

BACKGROUND OF THE INVENTION

1. Field of the Invention

The present invention generally relates to an improved heated tool for use in welding machines used to join thermoplastic sheets together. More particularly, the invention relates to an improved heated wedge which is designed to advantageously vary the amount of heat transferred to the sheet across the width of the weld.

2. Description of the Prior Art

The welding together of overlapped thermoplastic sheets by heating the upper surface of the lower sheet and the lower surface of the upper (overlapping) sheet, above their melting point, and then applying pressure so that the two melted surfaces join and fuse into a weld is a well established and documented practice. One of the earliest patents in the U.S. is U.S. Pat. No. 4,146,419, Inventor Wolfgang Neidhart, in which many features of currently used welding machines are described. This type of welding machine is widely used in the pollution control industry which lines landfills and other waste containment facilities with chemically resistant and durable thermoplastic sheet liners known as geomembranes.

The most widely used method of heating the surfaces of the sheets to be welded is by dragging a heated block of metal between the overlapped sheets. This block is usually heated by imbedded electrical resistance heaters, but can be heated by induction heating. This block is usually made in the form of a wedge, the wedge tapering to its thin end just ahead of the device which squeezes the two sheets together, usually by means of a set of opposing pinch rollers. It is common to produce two parallel weld tracks to facilitate air pressure testing of the weld seam.

The heating can also be achieved by a jet of hot air (or gas) being blown through a nozzle inserted between the overlapped sheets. This method is less favored because the low specific heat of air and the impracticality of blowing high volumes of air, means the only way of providing sufficient energy to melt the sheet surfaces is to raise the temperature of the air to a level which is damaging to the thermoplastic molecules, causing unwanted degradation. Detailed descriptions of so called Hot Wedge welding can be found in:"Hot Wedge Fusion Welding of HDPE Geomembranes" by Gary M Kolbasuk Published in "The Seaming Of Geosynthetics" edited by R. M. Koerner, published by Elsevier Applied Science ISBN 1 85166 4831 and;"Consistent Wedge Welder" by Fred Struve in "Geosynthetic Liner Systems: Innovations, Concerns, and Design" Published by Industrial Fabrics Association International ISBN 0 935803 01 7.

Until the present the welding parameters of concern have been the temperature of the heated wedge, the speed of welding, the force between the pinch rolls, and in addition the question of using a radiused shape for the heating surface, as opposed to a flat shape has been considered.

Long term durability tests and analysis of the welds have demonstrated that there is a temperature gradient across the heated-track, which becomes the weld-track. The edges are, relatively, the coolest, and the temperature increases to a maximum in the center of the track. Physically this translates into there being more molten material towards the center of the track. As the heated-track passes between the pinch rollers which force the two molten surfaces together some of the molten material is squeezed out of the forged weld zone and shows up as what is known as"squeeze out" at each edge of the weld-track. The fact that the center of the track has more molten material, which is squeezed out, is demonstrated by measuring the thickness of the weld across its width. Invariably the center is thinnest and the thickness gradually increases towards each edge of the weld-track. Analysis of this phenomenon by the German Federal Institute for materials development and testing has reported this and made recommendations regarding wedge temperatures, welder speed and pinch roll force, to keep the amount of thickness reduction within a predetermined safe range. The technical paper which reports this is"Assessment of Seam Quality and Optimization of the Welding Process of HDPE Geomembranes" by G. Lueders of the Bundesanstalt fuer Materialforschung und pruefung, Berlin, Germany, Published in the Proceedings of Sixth International Conference on Geosynthetics in Atlanta, March 1998

SUMMARY OF THE INVENTION

In a primary embodiment, the invention provides for an improved heated wedge, in which each heating surface has at least one area of reduced heat transfer efficiency for some distance along its length. These areas of reduced heat transfer reduce the amount of heat transferred from the wedge to those parts of the sheet which pass directly over them. By positioning such areas of reduced heat transfer efficiency centrally across the width of the wedge heating-track, and designing such areas' width shape and position along the length of the wedge, it is possible to vary the heat flow into the sheet across the weld-track width to achieve virtually any temperature gradient across the weld-track. In this manner the amount of molten material across the weld-track width can be controlled, and the flow-rate and quantity of squeeze-out, as well as the reduction in thickness across the weld, can be optimized.

BRIEF DESCRIPTION OF THE DRAWINGS

Further details of the invention are explained below with the help of the examples illustrated in the attached drawings in which.

DETAILED DESCRIPTION OF THE PREFERED EMBODIMENTS

Figure 2:
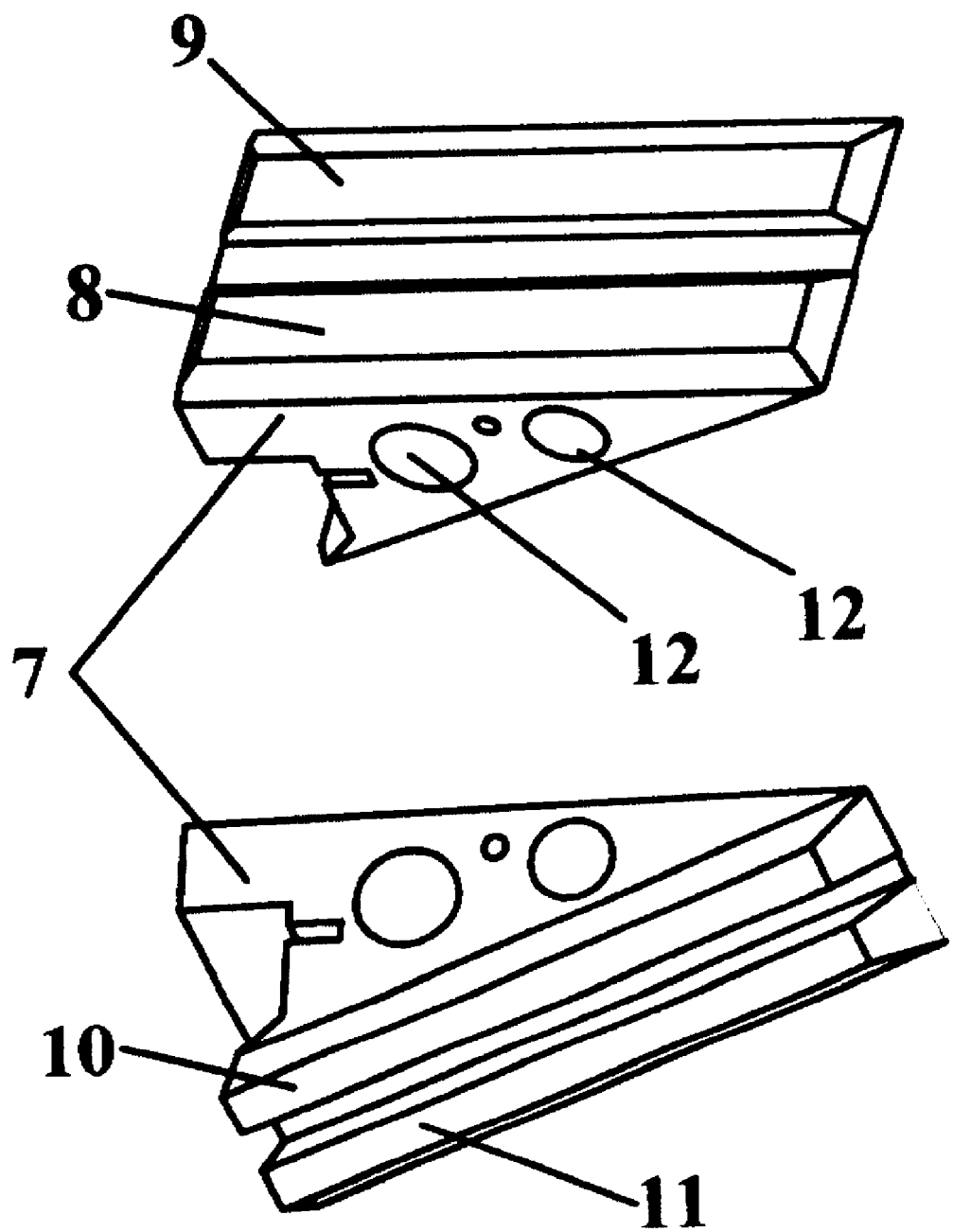
FIG. 2 depicts two views of a typical dual track heated wedge used for welding sheets of thermoplastic material.

FIG. 2 shows a typical heated wedge 7 with flat heating surfaces for dual track welding of thermoplastic sheets. Wedge 7 is heated by cartridge type electric resistance heaters 12 in known manner. Items 8 and 9 are the heating-tracks on the top of the wedge 7, and items 10 and 11 are the heating-tracks on the underside of the wedge 7

Figure 1:
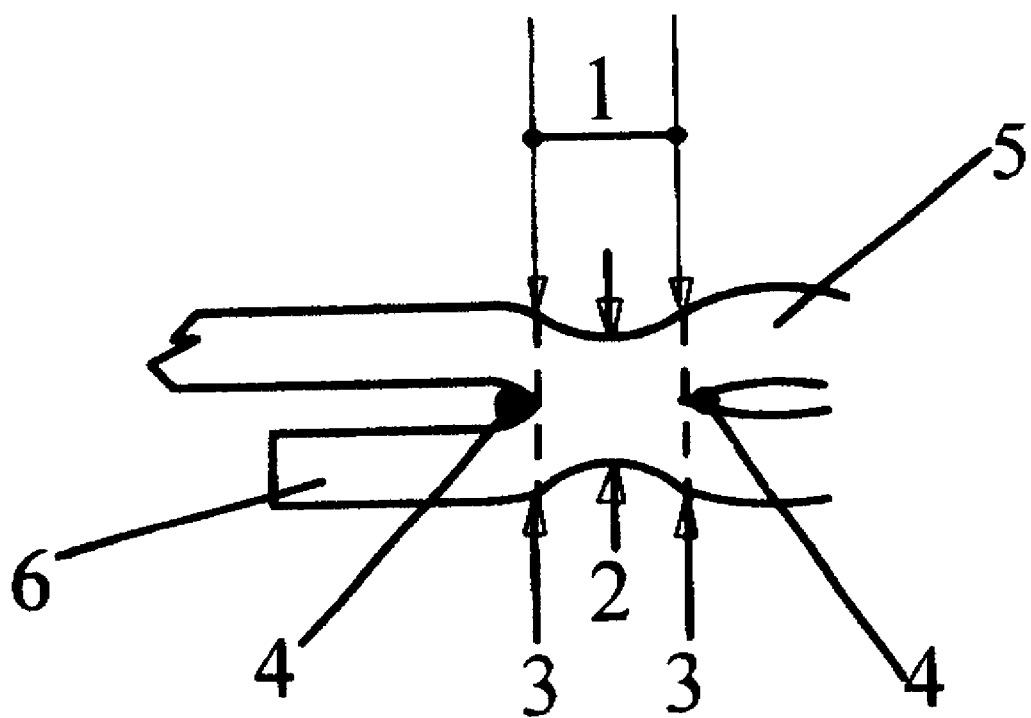
FIG. 1 depicts the cross-section of a single typical prior art weld-track where two sheets of thermoplastic material have been welded.

FIG. 1 shows the cross-section of one of the weld-tracks created by the use of wedge 7, in FIG. 2. Item 5, is the upper sheet which has been welded to item 6, the lower sheet. The weld-track width is shown as item 1. The thickness of the weld varies across its width from 3 at the edges to a minimum value of 2, usually close to the center of the weld-track width. The molten material which is squeezed out from between the sheets 5 and 6 ends up as two beads of material, items 4 commonly referred to as "squeeze-out", on either side of the weld-track. More of the initially hotter, less viscous molten material at the center of the weld-track is squeezed out resulting in thickness 2 being relatively thin compared to 3.

Figure 3:
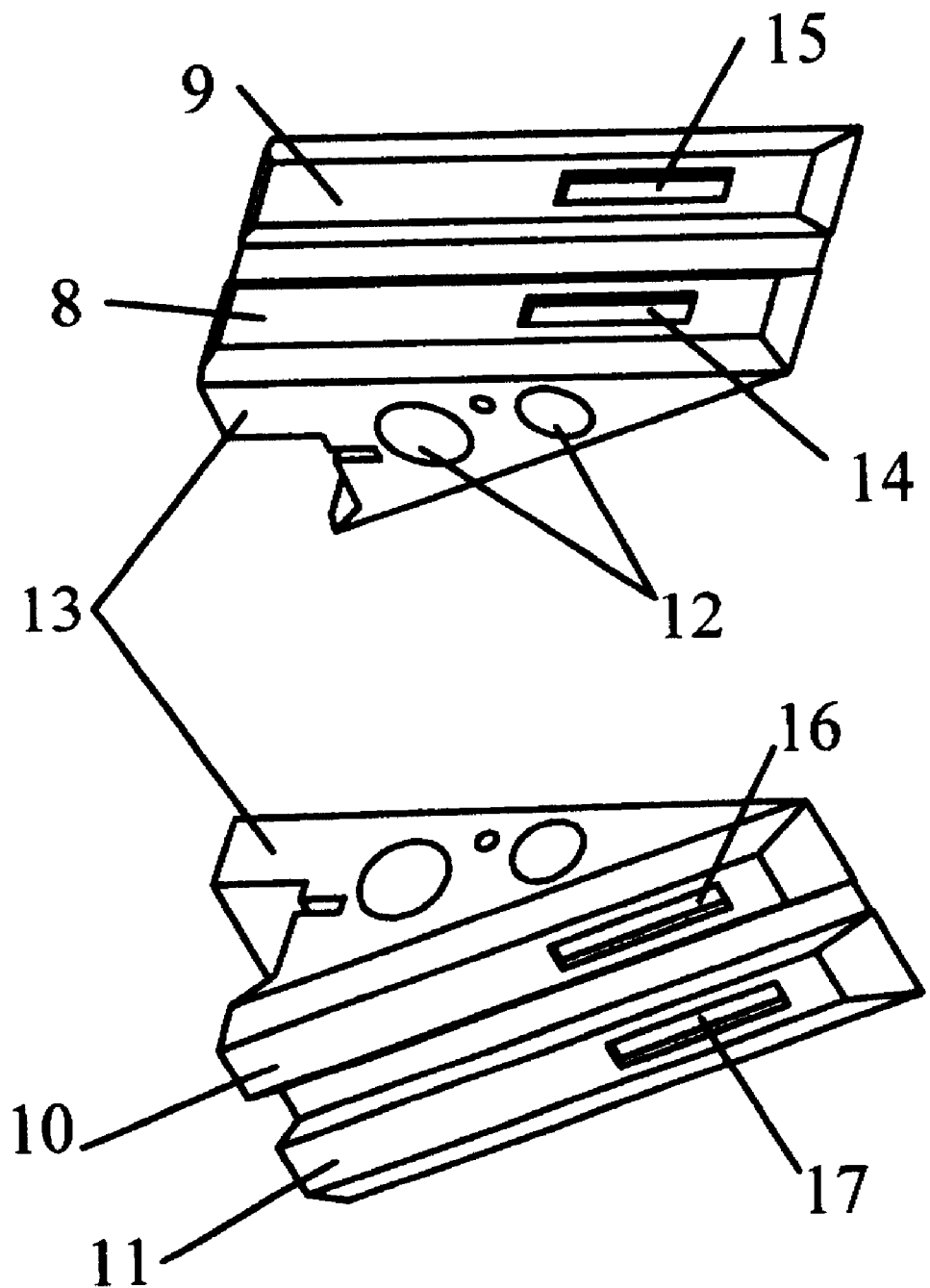
FIG. 3 depicts two views of a dual track heated wedge with recesses in the wedge heating-tracks to create areas of reduced heat transfer efficiency according to this invention.

This invention selectively reduces the amount of heat transferred from the heating-track of the wedge to any part of the weld-track of the sheet by introducing areas of reduced heat transfer efficiency to any selected part of the heat-track surfaces of the wedge. This can be achieved by depositing materials of different heat transfer characteristics on selected portions of the heat-tracks of the wedge, or as shown in FIG. 3 a wedge 13 which can be made from a wedge 7 in FIG. 2 by creating recesses 14, 15, 16 and 17 in the heat-track surfaces 8, 9, 10, and 11. In FIG. 3, for simplicity of illustration, the recesses 14,15,16, and 17 are all shown as identical, centrally positioned across the width of the heat-tracks and with constant width. There is in fact no restriction on the shape or positioning of such recesses or areas of reduced heat transfer efficiency.

Figure 4:
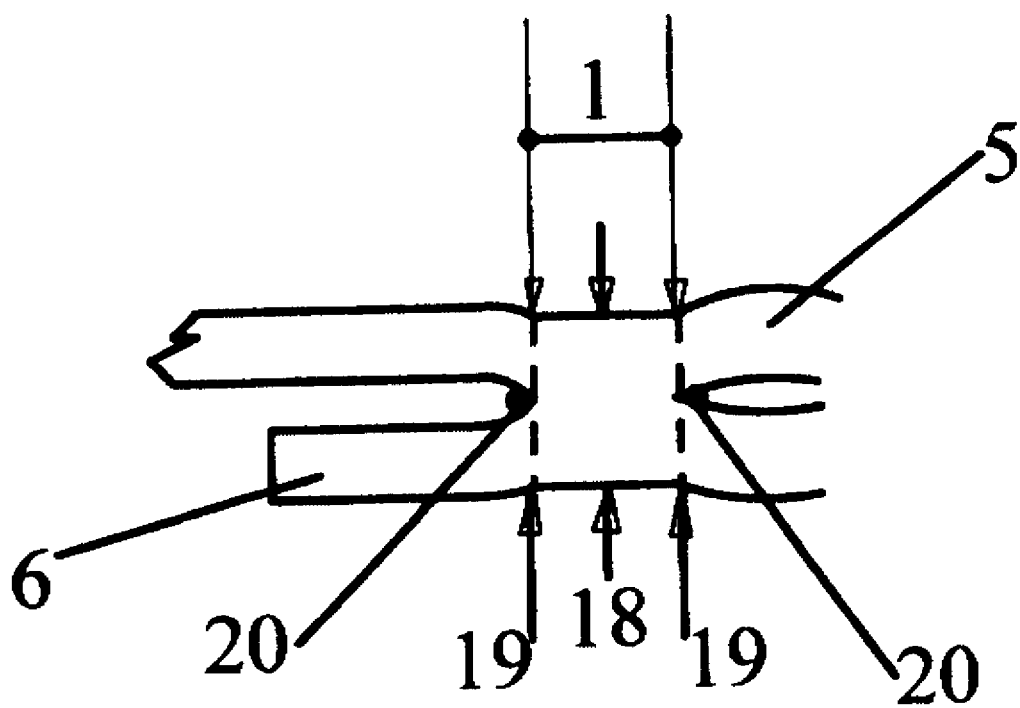
FIG. 4 depicts the cross-section of a single weld-track where two sheets of thermoplastic material have been welded using a heated wedge incorporating recesses in the heating-tracks in accordance with this invention.

FIG. 4 shows the cross-section of one of the weld-tracks created by the use of wedge 13, in FIG. 3. Item 5, the upper sheet which has been welded to item 6, the lower sheet. The weld-track width is shown as item 1. The thickness of the weld does not vary across its width from 19 at the edges to the thickness 18 at the center of the weld-track width. Compared to the weld of FIG. 1, there is less molten material which is squeezed out from between the sheets 5 and 6 to end up as two beads of material, items 20 commonly referred to as "squeeze-out", on either side of the weld-track. This is because the heated material at the center of the weld-track is now no hotter or less viscous than the heated material at the edges of the weld-tracks. The total amount of squeezed out is also reduced.

I claim:

1. A heated wedge-shaped tool for welding together sheets of thermoplastic material, the tool comprising:

means for heating the wedge-shaped tool;

a plurality of weld track surfaces extending along the length of the wedge-shaped tool which conduct heat to the thermoplastic material;

at least one of said surfaces having a first and second region and;

said first region of said surface adapted to have a heat transfer characteristic reduced from that of said second region;

whereby when sheet material is dragged over the wedge-shaped tool, less heat is transferred to the sheet which passes over said first region of the tool.

2. The heated wedge-shaped tool of claim 1 wherein the means for reducing the heat transfer efficiency of said first region comprises a recess.

3. The heated wedge-shaped tool of claim 1 wherein the means for reducing the heat transfer efficiency of said first region comprises material of different heat transfer characteristics deposited on the weld track surface.

4. The heated wedge-shaped tool of claim 1 wherein the reduced heat transfer region is adapted to make a weld of equal thickness across its width.

* * * * *